Oct. 6, 1959    A. A. HELGESON ET AL    2,907,604
THEFT-PROOF HUB CAP ASSEMBLY
Filed Jan. 6, 1958
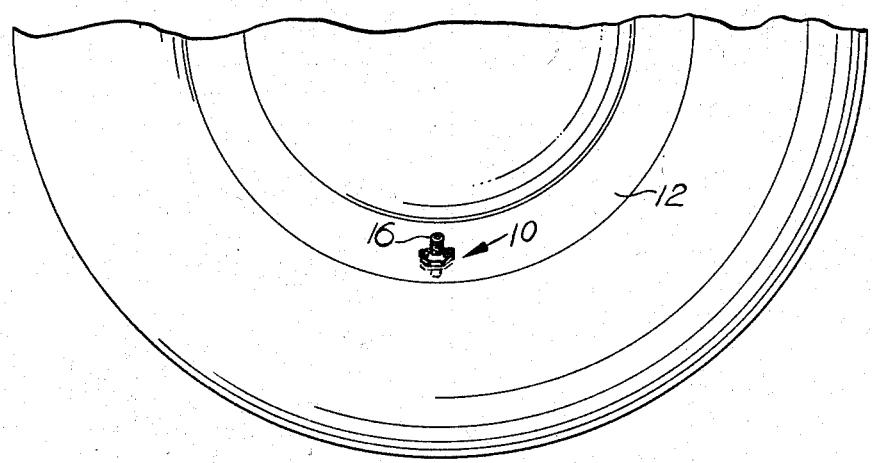
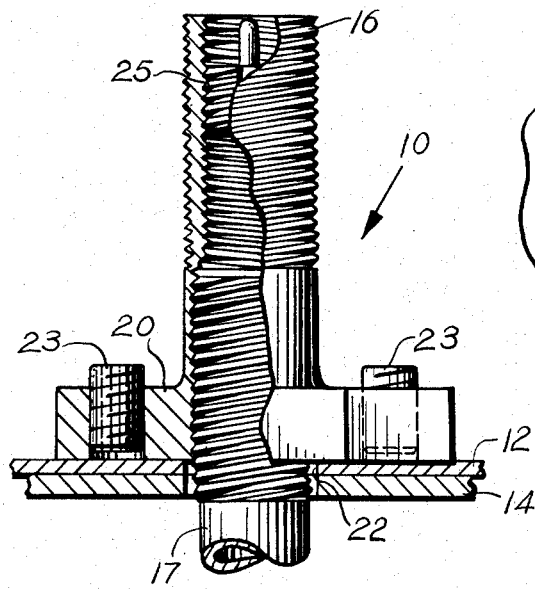
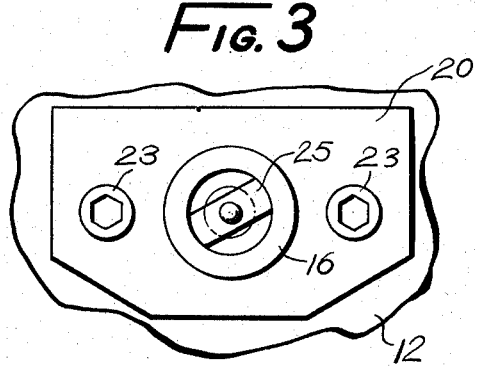
Andrew A. Helgeson INVENTOR.
Clarence M. Hegna __United States Patent Office__

2,907,604
Patented Oct. 6, 1959

2,907,604

THEFT-PROOF HUB CAP ASSEMBLY

Andrew A. Helgeson, Rapid City, and Clarence M. Hegna, Custer, S. Dak., assignors of one-tenth to Gadget-Of-The-Month Club, Inc., Los Angeles, Calif., a corporation of California Application January 6, 1958, Serial No. 707,415

3 Claims. (Cl. 301—37)

This invention relates to automotive vehicles and more particularly to an accessory therefor.

It is an object of the present invention to provide a theft proof lock for the hub caps of automotive vehicle wheels which will effectively prevent such theft without interfering with the normal operation of the unit.

Another object of the present invention is to provide a safety lock for hub caps which is associated with the valve stem of the wheel so as to automatically deflate the tire in response to the unauthorized removal of the hub cap.

Other objects of the invention are to provide a theft proof lock for hub caps bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary side elevational view of a wheel embodying a hub cap lock made in accordance with the present invention;

Figure 2 is an enlarged longitudinal cross sectional view of the hub cap lock assembly, in operative association with the wheel and hub cap; and Figure 3 is a plan view of the structure shown in Figure 2.

Referring now more in detail to the drawing, a hub cap lock 10 made in accordance with the present invention is shown in operative association with a hub cap 12 which is mounted upon an automotive vehicle wheel 14. This lock includes a valve stem extension unit which has a valve stem extension 16 and a base flange 20. The base flange 20 has an internally threaded bore for threadingly receiving the valve stem 17 of the wheel and tire assembly.

In actual use, the hub cap is first mounted upon the wheel and the valve stem extension unit is then threaded on to the valve stem 17 until the base flange 20 overlies the portions of the hub cap around the valve stem opening 22. By then tightening down upon the recessed head type set screws 23 which are arranged at diametrically opposite sides of the valve stem extension 16, the valve stem extension unit is effectively locked against rotation relative to the hub cap and valve stem. The air valve 25 is disposed within the valve stem extension 16, whereby the normal inflation, deflation, and checking of the tire can be accomplished without removing the hub cap locking structure. However, in the event that an attempt is made to remove the hub cap 12, the base flange 20 effectively clamps the hub cap to the wheel assembly. In the event that the flange 20 and valve stem extension 16 is removed from the wheel assembly in order to remove the hub cap, the air will automatically be permitted to escape through the valve stem 17 since the control valve 25 is removed with the valve stem extensions unit. This will, of course, create a substantial amount of noise so as to act as a burglar alarm so as to discourage the continued attempts to remove that or additional hub caps from the vehicle.

If desired, the recessed head type set screws can be dispensed with and the extension valve stem 16 can be provided with a non-circular wrench receiving portion in place thereof so as to enable the extension unit to be tightened down by means of a wrench in association with the hub cap.

An extension to the valve stem, screwed onto the valve stem, with a gasket between, and the valve core screwed into the extension, with a flange on the bottom of the extension, is incorporated in the basic idea.

While various changes may be made in the detail construction, it shall be understood that such changes shall be within the spirit and scope of the present invention as defined by the appended claims.

What I claim as new and desire to protect by Letters Patent of the United States is:

1. A theft proof hub cap assembly for automotive vehicles comprising, in combination, a hub cap having a valve stem receiving opening, a valve stem mounting having a base overlying said hub cap, said base having an internally threaded bore for threaded engagement with a valve stem, said valve stem base being of substantially larger size than said valve stem receiving opening in said hub cap to prevent disassembly of said hub cap from the valve stem, a valve stem extension integral with said base in communication with said bore, and lock means comprising a plurality of set screws threadingly carried by said base for pressure abutment with said hub cap for preventing relative rotation between said valve stem mounting and said hub cap.

2. The combination according to claim 1, further comprising an inlet valve within said valve extension.

3. The combination according to claim 2, wherein said set screws are disposed at diametrically opposite sides of said valve stem extension.

References Cited in the file of this patent

UNITED STATES PATENTS

| | | |
|---|---|---|
| 2,778,215 | Redmond | Jan. 22, 1957 |
| 2,812,000 | Trinca | Nov. 5, 1957 |